United States Patent
Wakai et al.

(10) Patent No.: US 6,196,780 B1
(45) Date of Patent: Mar. 6, 2001

(54) THREADED ANCHOR

(75) Inventors: Takao Wakai; Kazuhiro Ukai, both of Osaka (JP)

(73) Assignee: Wakai & Co., Ltd., Osaka (JP)

( * ) Notice: Subject to any disclaimer, the term of this patent is extended or adjusted under 35 U.S.C. 154(b) by 0 days.

(21) Appl. No.: 09/520,151

(22) Filed: Mar. 7, 2000

(51) Int. Cl.⁷ .................................................. F16B 25/00
(52) U.S. Cl. ........................ 411/80.1; 411/30; 411/387.1; 411/21
(58) Field of Search ........................... 411/21–23, 79, 411/30, 80.1, 80.2, 80.5, 80.6, 55, 387.1, 387.8

(56) References Cited

U.S. PATENT DOCUMENTS

| | | | |
|---|---|---|---|
| 3,516,324 | * | 6/1970 | Berner . |
| 4,601,625 | * | 7/1986 | Ernst . |
| 4,637,765 | * | 1/1987 | Omata . |
| 5,224,805 | * | 7/1993 | Moretti . |
| 5,536,121 | * | 7/1996 | McSherry . |

* cited by examiner

Primary Examiner—Flemming Saether
(74) Attorney, Agent, or Firm—Wenderoth, Lind & Ponack, L.L.P.

(57) ABSTRACT

An anchor has a hollow shank having a head at one end and an integral blade portion at the other end and formed with male threads on the outer periphery. Cuts are formed in a peripheral wall of the hollow shank to define therebetween a bendable portion adapted to bend when pushed out by a mounting screw driven into the hollow shank. The blade portion is substantially semicylindrical with side edges defining cutting edges. Ribs for inclining the mounting screw are formed on the inner surfaces of the blade portion and the hollow shaft, respectively. When a mounting screw is driven through the article into the anchor to fix an article to the board, the mounting screw is inclined relative to the anchor, so that the bendable portion is pushed out, thus preventing the anchor from rotating together with the screw.

2 Claims, 2 Drawing Sheets

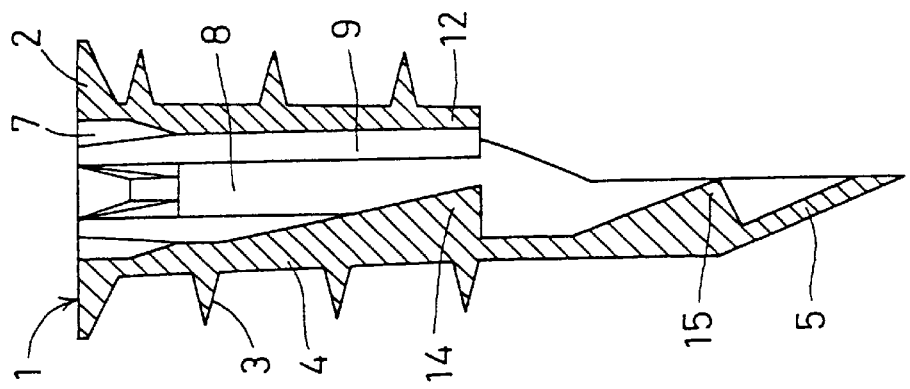
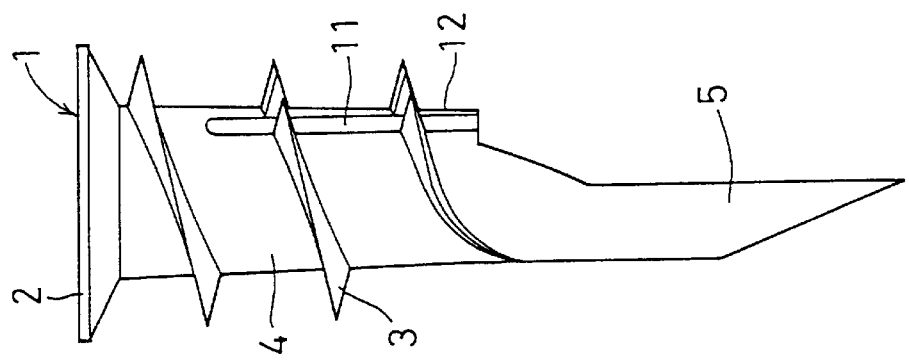
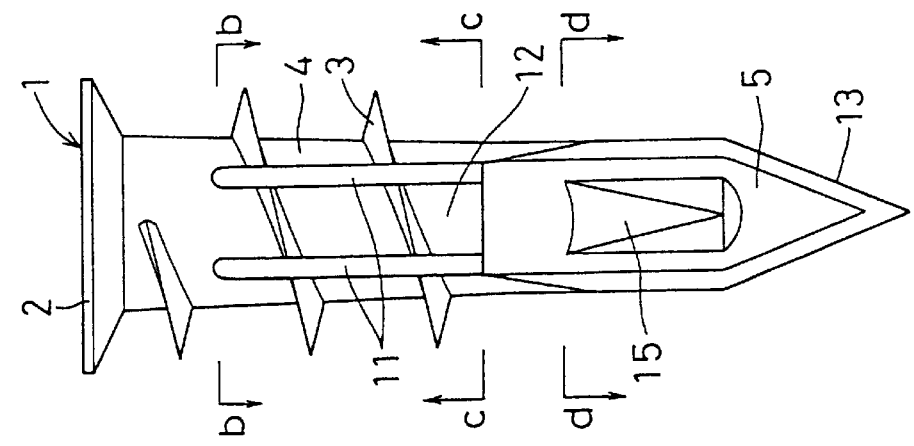

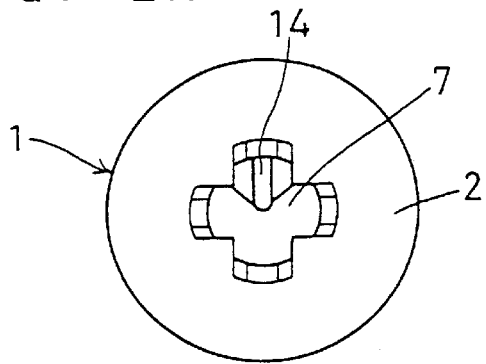
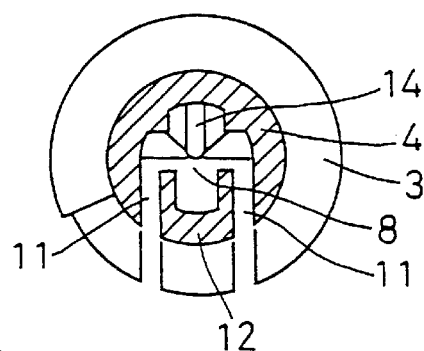
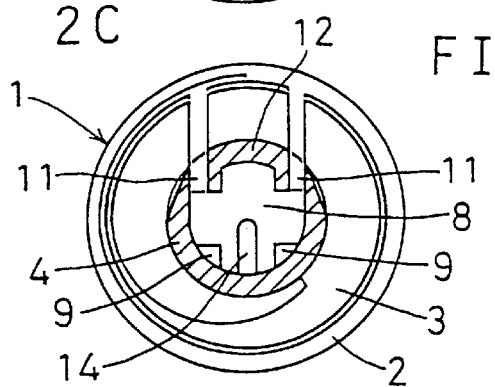
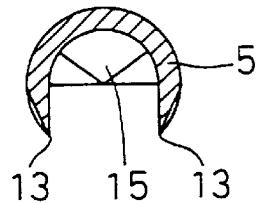
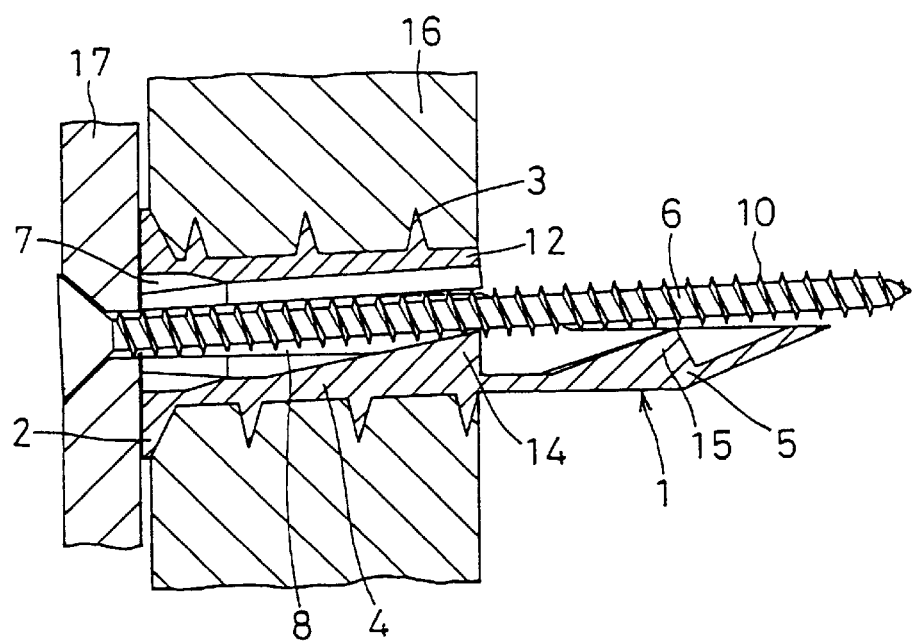

THREADED ANCHOR

BACKGROUND OF THE INVENTION

This invention relates to threaded anchors used to reinforce a brittle wall member such as a plaster board when an article is to be fixed to the wall member by use of screws.

If nails or screws are directly driven into a brittle wall member such as a plaster board to fix an article to the wall member, they cannot engage the wall securely but come off easily. Thus, anchors or plugs for reinforcing the wall are needed.

Conventional such anchors have a hollow shank having a head at one end and an integral blade portion at the other end and formed with male threads on its outer periphery. Some blade portions are cylindrical with or without a serrated cutting edge at the tip, others are plate-shaped with a pointed tip, and still others are conical with an edge-defining recess on the outer periphery and adapted to bend when a mounting screw is driven in.

When an anchor with a cylindrical blade is driven into a wall member, chips tend to get into the blade and be compacted like a hard cork, which increases the resistance to driving the mounting screw, thus weakening the force with which the anchor is tightened in the wall member. When an anchor having a cylindrical blade with a serrated edge at its tip is brought into abutment with a wall member, the anchor tends to slip in the initial stage of boring due to a small contact area with the wall member. It is thus difficult to drive in such an anchor.

In the case of an anchor with a flat plate-shaped or conical blade, chips of the wall member are discharged outwardly, thus messing the finish when the anchor has been driven in. Also, the wall tends to collapse at its back due to weak chip discharging force.

Moreover, when the mounting screw is driven in, especially if the screw is a long one, the blade portion has to be inclined and the bottom of the hollow shank of the anchor has to be broken. This weakens the force with which the anchor is tightened in the wall member.

Furthermore, since conventional anchors of all types have inner diameters corresponding to individual mounting screws, each anchor can be used with only limited kinds of mounting screws. Conventional anchors also have a problem in that they tend to come off together with a mounting screw when the latter is unscrewed.

An object of the present invention is to provide a threaded anchor which provides a beautiful finished surface when set, increased tightening force, and which can be used with increased variety of mounting screws, and an which never turns together with the mounting screw when the screw is turned in a loosening direction.

SUMMARY OF THE INVENTION

According to this invention, there is provided a threaded anchor comprising a hollow shank having a head at one end thereof and a blade portion at the other end thereof and formed with male threads on the outer periphery thereof, the shank having a peripheral wall formed with a pair of cuts to define therebetween a bendable portion adapted to bend outwardly when pushed by a mounting screw driven into the hollow shank, the blade portion being substantially semicylindrical with a pointed tip and coaxial with the shank, a first rib and a second rib formed on the inner walls of the blade portion and the hollow shank, respectively, to incline the mounting screw driven into the hollow shank.

Other features and objects of the present invention will become apparent from the following description made with reference to the accompanying drawing, in which:

BRIEF DESCRIPTION OF THE DRAWINGS

FIG. 1A is a front view of an anchor embodying the invention;

FIG. 1B is a side view thereof;

FIG. 1C is a vertical sectional side view thereof;

FIG. 2A is a plan view of the anchor of FIG. 1A;

FIG. 2B is a cross sectional view taken along the arrow b—b of FIG. 1A;

FIG. 2C is a cross sectional view taken along the arrow c—c of FIG. 1A;

FIG. 2D is a cross sectional view taken along the arrow d—d of FIG. 1A; and

FIG. 3 is a vertical sectional view of the anchor driven into a board and an article secured by a mounting screw.

DETAILED DESCRIPTION OF THE PREFERRED EMBODIMENT

An embodiment of this invention is described with reference to the drawings.

As shown, an anchor 1 comprises a hollow shank 4 having a head 2 at one end and formed with male threads 3 on its outer periphery, and a blade portion 5 integrally formed at the other end of the shank 4. To secure an article to a wall member, the anchor 1 is used together with a separate mounting screw which is threaded into the anchor 1.

The hollow shank 4 is tapered such that its outer peripheral diameter increases toward the head 2. The diameter of the male threads 3 also increases toward the head 2. The head 2 has a slightly larger diameter than the maximum diameter of the male threads 3 and is thin.

A cross groove 7 for accepting a screwdriver tip is formed in the center of the head 2. Contiguous with the groove 7, an axial bore 8 extends through the hollow shank 4. The bore 8 has the section of a cross, and has a maximum diameter slightly smaller than the diameter of the groove 7. The shank 4 is formed with four ridges 9 on the inner periphery thereof. The distance from the tips of the ridges 9 to the axis of the hollow shank 4 is determined such that threads 10 of a mounting screw 6 (FIG. 3) to be used in combination with the anchor 1 can bite into the ridges 9.

The blade portion 5 is substantially straight and of a semi-cylindrical section having the same diameter as the hollow shank 4 at its bottom. It is coaxial with the shank 4. Thus, the bottom of the hollow shank 4 is open. The side edges of the blade portion extend downwardly and define cutting edges 13.

Two parallel axial cuts 11 (FIG. 1A) are formed in the wall of the hollow shank 4 at its portion opposite the blade portion 5 with respect to the axis of the shank 4 so as to extend upwardly from the open end of the hollow shank 4 toward the head 2. The cuts 11 define therebetween a U-shaped bendable portion 12 (FIGS. 1A and 2B) which forms a part of the cross bore 8 and is bendable outwardly pushed by the mounting screw 6 threaded into the hollow shank 4.

Axially aligned ribs 14 and 15 (FIG. 3) are formed on the inner surface of the hollow shank 4, diametrically opposite the bendable portion 12, and on the inner surface of the blade portion 5, respectively, to incline the mounting screw 6 driven into the hollow shank 4. As shown in FIG. 1C, the ribs 14, 15 slope inwardly from the head toward the tip of the blade portion 5, i.e. forwardly with respect to the direction in which the mounting screw 6 proceeds through the shank 4, to push the screw 6 against the bendable portion 12.

As shown in FIG. 1C, the rib 14 narrows the width of the cross bore 8. It is thus possible to increase the usable diameter range and the number of usable kinds of mounting screws 6 usable in combination with the anchor 1. For example, besides ordinary mounting screws such as shown in FIG. 3, machine bolts can also be used in combination.

In order to secure an article 17 to e.g. a plaster board 16 using the anchor according to this invention (FIG. 3), a screwdriver is engaged in the groove 7 in the head 2 with the tip of the blade portion 5 pressed against the surface of the board 16. By turning the driver in this state, the cutting edges 13 cut circularly into the board 16 while cutting the board 16. The blade portion 5 thus penetrates into the board 16.

At this time, since the blade portion 5 has a substantially semicircular section, cuttings never come out of the surface of the board 16, so that when the anchor 1 has been completely driven in, the surface finish of the board 16 is beautiful. Also, since the blade portion 5 is semicylindrical, its peripheral wall is partially open, so that chips confined inside can be discharged smoothly once the screw has passed through the board 16. Thus, chips are easily removed by being pushed by the mounting screw 6 driven into the anchor, so that no undue resistance acts on the screw 6 being driven in.

The hollow shank 4 penetrates into the starting hole formed in the board 16 by the blade portion 5, so that the male threads 3 firmly engage the starting hole. When the head 2 abuts the surface of the board 16 as shown in FIG. 3, the anchor 1 is firmly secured in the board 16.

In this state, a mounting screw 6 is driven through an article 17 placed on the board 16 into the hollow shank 4. The screw 6 penetrates through the shank while tapping the inner wall of the bore 8.

When the mounting screw 6 is driven into the hollow shank 4, its tip is guided by the rib 14 such that the screw inclines off axis toward the bendable portion 12. The latter is thus pushed outwardly by the screw 6 beyond the outer circumference of the anchor, while partially compressing the board 16. If the mounting screw 6 is a long one, the tip of the mounting screw 6 will move onto the rib 15 as shown in FIG. 3.

Once pushed outward, the bendable portion 12 prevents the anchor 1 from turning relative to the board 16. Since the mounting screw 6 driven into the anchor 1 is inclined and not coaxial relative to the anchor 1, it is possible to effectively prevent the anchor 1 from rotating together with the mounting screw 6 when the latter is driven into the former and thus to increase the resistance to the force that tends to pull out the anchor 1 or the mounting screw 6. The article 17 can thus be firmly secured to the board 16 by the mounting screw 6 using the anchor 1 as a board reinforcing member.

When the mounting screw 6 is turned in the unscrewing direction to remove the article 17, an angular moment acts on the anchor 1. But since the anchor 1 is prevented from rotating by the outwardly protruding bendable portion 12, and also since the screw is inclined relative to the anchor 1, and thus the resistance to the angular moment on the anchor 1 is asymmetrical with respect to the central axis, even when the mounting screw 6 is turned in the unscrewing direction, the anchor 1 will never turn together with the mounting screw 6. Thus, it is possible to remove the article 17 with the anchor 1 left in the board 16.

What is claimed is:

1. A threaded anchor comprising a hollow shank having a head at one end thereof and a blade portion at the other end thereof and formed with male threads on the outer periphery thereof, said shank having a peripheral wall formed with a pair of cuts to define therebetween a bendable portion adapted to bend outwardly when pushed by a mounting screw driven into said hollow shank, said blade portion being substantially semicylindrical with a pointed tip and coaxial with said shank, a first rib and a second rib formed on the inner walls of said blade portion and said hollow shank, and respectively, to incline the mounting screw driven into said hollow shank.

2. A threaded anchor as claimed in claim 1 wherein said blade portion is formed integrally with said hollow shank such that an open end is formed at said other end of said hollow shank, wherein said cuts are parallel to each other and extend from said open end toward said head, at a position opposite said blade portion with respect to the axis of said hollow shank, and wherein said second rib is formed opposite said bendable portion with respect to said axis, said ribs sloping inwardly toward the axis in a direction toward the tip of said blade portion.

* * * * *